United States Patent [19]
Bachmann et al.

[11] Patent Number: 4,886,599
[45] Date of Patent: Dec. 12, 1989

[54] FILTER CARTRIDGE WITH SERIES ELEMENTS FOR CHEMICAL AND MECHANICAL FILTRATION

[75] Inventors: Paul Bachmann; Hanns-Peter Berges, both of Cologne; Wolfgang Leier, Bergisch-Gladbach, all of Fed. Rep. of Germany

[73] Assignee: Leybold AG, Cologne, Fed. Rep. of Germany

[21] Appl. No.: 111,592

[22] Filed: Oct. 23, 1987

[30] Foreign Application Priority Data

Oct. 23, 1986 [DE] Fed. Rep. of Germany ... 8628284[U]

[51] Int. Cl.⁴ ..................... B01D 27/02; B01D 27/06
[52] U.S. Cl. .................... 210/287; 210/314; 210/416.5; 210/444; 210/502.1; 210/DIG. 5; 210/DIG. 6; 55/316; 55/486; 55/498; 55/521
[58] Field of Search ............ 210/263, 314, 315, 416.4, 210/416.5, 440, 443, 444, DIG. 5, DIG. 6, 502.1, 287; 55/179, 275, 316, 485, 486, 498, 500, 521

[56] References Cited

U.S. PATENT DOCUMENTS

| | | | |
|---|---|---|---|
| 3,228,527 | 1/1966 | McPherson | 210/315 |
| 3,662,893 | 5/1972 | Humbert, Jr. | 210/315 |
| 3,836,005 | 9/1974 | Bauer | 210/315 |
| 4,231,768 | 11/1980 | Seibert et al. | 55/179 |
| 4,372,847 | 2/1983 | Lewis | 210/416.5 |
| 4,557,829 | 12/1985 | Fields | 210/315 |

FOREIGN PATENT DOCUMENTS

8329813.4 10/1983 Fed. Rep. of Germany.

*Primary Examiner*—Richard V. Fisher
*Assistant Examiner*—Wanda L. Millard
*Attorney, Agent, or Firm*—Spencer & Frank

[57] ABSTRACT

A filter cartridge for cleaning oil of an oil sealed vacuum pump which comprises a cartridge housing, the cartridge housing being releasably mounted to the vacuum pump; filter materials including at least two types of filters having different characteristics, the filter materials including the filters being disposed in the cartridge housing.

7 Claims, 1 Drawing Sheet

FILTER CARTRIDGE WITH SERIES ELEMENTS FOR CHEMICAL AND MECHANICAL FILTRATION

BACKGROUND OF THE INVENTION

1. Field of the Invention

The invention relates to a filter cartridge for cleaning oil of an oil sealed vacuum pump. The cartridge is releasably fastened to the vacuum pump and contains filter materials. Filter cartridges of this type are included in the oil circuit of the vacuum pump and oil flows continuously through them. The oils employed in vacuum pumps may be mineral oils, synthetic lubricants, e.g. perfluorated hydrocarbons or the like.

2. Discussion of the Prior Art

A filter cartridge of the above-mentioned type is disclosed in German Utility Model Patent No. 83 29 813. This prior art filter cartridge contains an adsorption agent, i.e. activated aluminum oxide, as its filter material. This filter material is suitable for removing oil fatigue products and polar impurities from the liquid lubricant of the vacuum pump by chemical effects. Additionally, the grain size of the filter material is selected to be so small that it is possible to catch solid particles down to a grain size of $1\mu$ through mechanical effects. In using the prior art filter cartridges it has been found that the filter layer builds up a relatively high resistance in a relatively short time so that a bypass valve opens. The bypass valve is customarily included in the prior art filter cartridges. With an open bypass valve, the liquid lubricant flows through the pump circuit in an unfiltered state.

SUMMARY OF THE INVENTION

It is an object of the present invention to substantially increase the service life of oil filters without having to relinquish the filter concept, i.e. filtration of the liquid lubricant of a vacuum pump in an exchangeable cartridge.

The above and other objects are accomplished by the invention in which a filter cartridge for cleaning oil of an oil sealed vacuum pump comprises a cartridge housing, the cartridge housing being releasably mounted to the vacuum pump, filter materials and at least two types of filtering means having different characteristics, the filter materials and the filtering means being disposed in the cartridge housing.

Advisably, a mechanically acting and a chemically acting filter stage are provided in the filter. The mechanically acting filter stage is placed upstream of the chemically acting filter stage when seen in the direction of flow of the oil to be cleaned.

The present invention is based on the realization that the early build-up of a high resistance in the filter layer of the prior art filter cartridge is caused by solid particles and gels which clog the densely packed filter material. This problem is due to the relatively small grain size of the filter material. The cartridge according to the invention makes it possible to arrange a mechanically acting filter stage and a chemically acting filter stage in succession and thus the chemically acting filter stage is freed of the task of also having to catch solid particles. The grain size of the chemically active filter stage, which is preferably present in the form of a granulate of activated aluminum oxide, may be selected to be relatively coarse, e.g. 0.5 to 5 mm and preferably 1 to 3 mm. The chemical efficiency of this filter layer is not impeded compared to a filter layer employing smaller grain sizes. The mechanically acting filter stage which is preferably provided in the form of a paper filter and is upstream of the chemically acting filter layer, takes over the separation of solid particles and gels and therefore no longer charge the chemically acting filter layer. In addition to aluminum oxide, other adsorbents or absorbents, such as fuller's earth, may also be employed as a filter material.

The solution according to the invention constitutes a simple combination of a mechanical filter and a chemical depth filter which is effective for vacuum pumps. Depending on the filtration task, the service life of filter cartridges of this type is up to 100% longer than the service life of prior art filter cartridges since the combination of different filter principles in one cartridge permits improved utilization of the filter materials. This also brings about the advantage of an extended service life for the liquid sealants of the vacuum pumps.

BRIEF DESCRIPTION OF THE DRAWINGS

The invention may be better understood by referring to the detailed description of the invention when taken in conjunction with the accompanying drawings in which.

DESCRIPTION OF THE PREFERRED EMBODIMENTS

Figure 1:
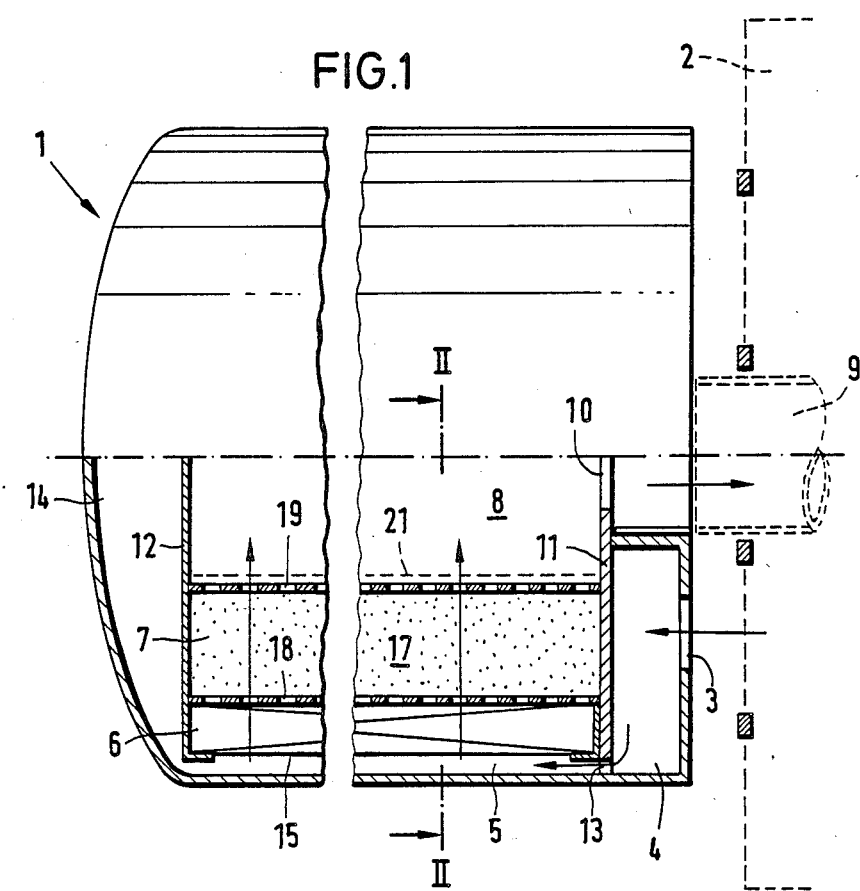
FIG. 1 shows a partial longitudinal sectional view of the filter cartridge.
Figure 2:
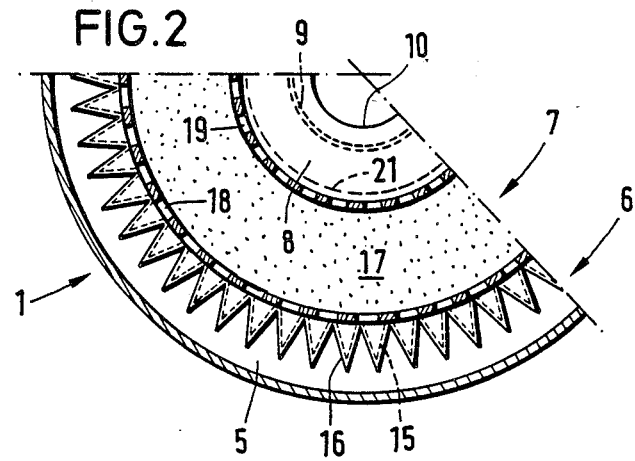
FIG. 2 shows a partial cross-sectional view of the filter cartridge.

Cartridge 1 is releasably fastened to the housing 2 (which is shown in dashed lines) of a vacuum pump. The manner of fastening the filter to the pump may be as disclosed in the prior art. Upon fastening filter cartridge 1 to housing 2 of the vacuum pump, the oil flow channels in the vacuum pump become tightly connected with the oil flow channels in cartridge 1.

In the illustrated embodiment, the liquid lubricant to be cleaned leaves housing 2 and enters the filter cartridge 1 through a frontal opening 3 and then continues into an annular chamber 4 disposed at its frontal face. From annular chamber 4, the lubricant flows into annular chamber 5 which surrounds the concentrically arranged filter stages 6 and 7. After flowing through these filter stages, the lubricant enters a central chamber 8 and then flows through opening 10 into conduit 9 which is connected with the oil circuit of the vacuum pump.

Filter stages 6 and 7 are positioned so that the lubricant to be cleaned is guided by means of a housing structure disposed within cartridge 1 by two plates 11 and 12 disposed at the frontal face. Plate 11 is provided with connecting openings 13 between annular chambers 4 and 5 and with connecting openings 10 between central chamber 8 and conduit 9. Plate 12 seals central chamber 8 against the remaining interior 14 of the cartridge. A bypass valve (not shown) is customarily provided in the center of plate 12. This valve opens if filter layers 6 and 7 are blocked and the pressure of the inflowing oil exceeds a certain limit value. Since annular chamber 5 is connected with interior 14, the lubricant can flow back directly into central chamber 8 without undergoing filtration.

The two filter stages 6 and 7 are held between the two plates 11 and 12. Filter stage 6 is composed of a pleated paper filter 15 whose pleats extend axially.

Since chemically reactive substances harden the paper and thus cause it to become brittle, a folded screen-like supporting fabric 16 is associated with the pleated paper filter and rests against paper filter 15 on the downstream side. The filter material may be a filter paper suitable for mineral oils or the like which is suitable to catch solids particles down to the submicron range. Gel-like substances are also unable to pass through such a filter material.

The mechanically acting filter stage 6 is followed by the chemically acting filter stage 7. This filter stage 7 includes a filter layer 17 composed of relatively coarse grained activated aluminum oxide. Concentric walls 18 and 19 made of a perforated material extend between the two frontal plates 11 and 12 and serve to support the filter granulate.

In a variation of the embodiment according to the invention, a third filter stage may additionally be provided within the chemically acting filter stage 7. This third filter stage is indicated by dashed lines and given the reference numeral 21. It may, for example, also be a paper filter which is able to retain particularly fine solids particles (smaller than $1\mu$). In this case it is possible to select the permeability of filter paper 15 to be somewhat coarser.

It will be understood that the above description of the present invention is susceptible to various modifications, changes and adaptations, and the same are intended to be comprehended within the meaning and range of equivalents of the appended claims.

What is claimed is:

1. A filter cartridge for cleaning oil contained in an oil sealed vacuum pump comprising:
   a cartridge housing, said cartridge housing being releasably mountable to the vacuum pump;
   a fluid path defined in said cartridge housing; and
   at least two types of filtering means having respectively different characteristics disposed in series in said cartridge housing along and forming a part of said fluid path,
   said filtering means including a mechanically acting filter stage and a chemically acting filter stage, said mechanically acting filter stage being disposed upstream of said chemically acting filter stage with respect to said fluid path, said chemically acting filter stage being composed of at least one of a chemical absorbent and adsorbent from the class consisting of fuller's earth and activated aluminum oxide in the form of a granulate having a grain size from 1 to 3 mm.

2. A filter cartridge as defined in claim 1, wherein said mechanically acting filter stage is a paper filter.

3. A filter cartridge as defined in claim 2, wherein said paper filter is pleated so that the surface area of said paper filter is enlarged.

4. A filter cartridge as defined in claim 3, further comprising a folded screen-like mechanical support composed of a screen fabric, said screen fabric being downstream of said pleated paper filter in said flow direction.

5. A filter cartridge as defined in claim 2, wherein said paper filter is of a structure capable of trapping solid particles down to a grain size of less than 1 micron.

6. A filter cartridge as defined in claim 1, wherein said at least two filtering means being concentrically arranged in said filter housing.

7. A filter cartridge as defined in claim 6, further comprising a further mechanically acting filter stage, wherein said first-recited mechanically acting filter stage surrounds said chemically acting filter stage and said further mechanically acting filter stage is concentrically arranged within said chemically acting filter stage.

* * * * *